Aug. 23, 1932.  C. F. DREYER  1,873,315
GAUGING APPARATUS
Filed Dec. 28, 1927  3 Sheets-Sheet 1
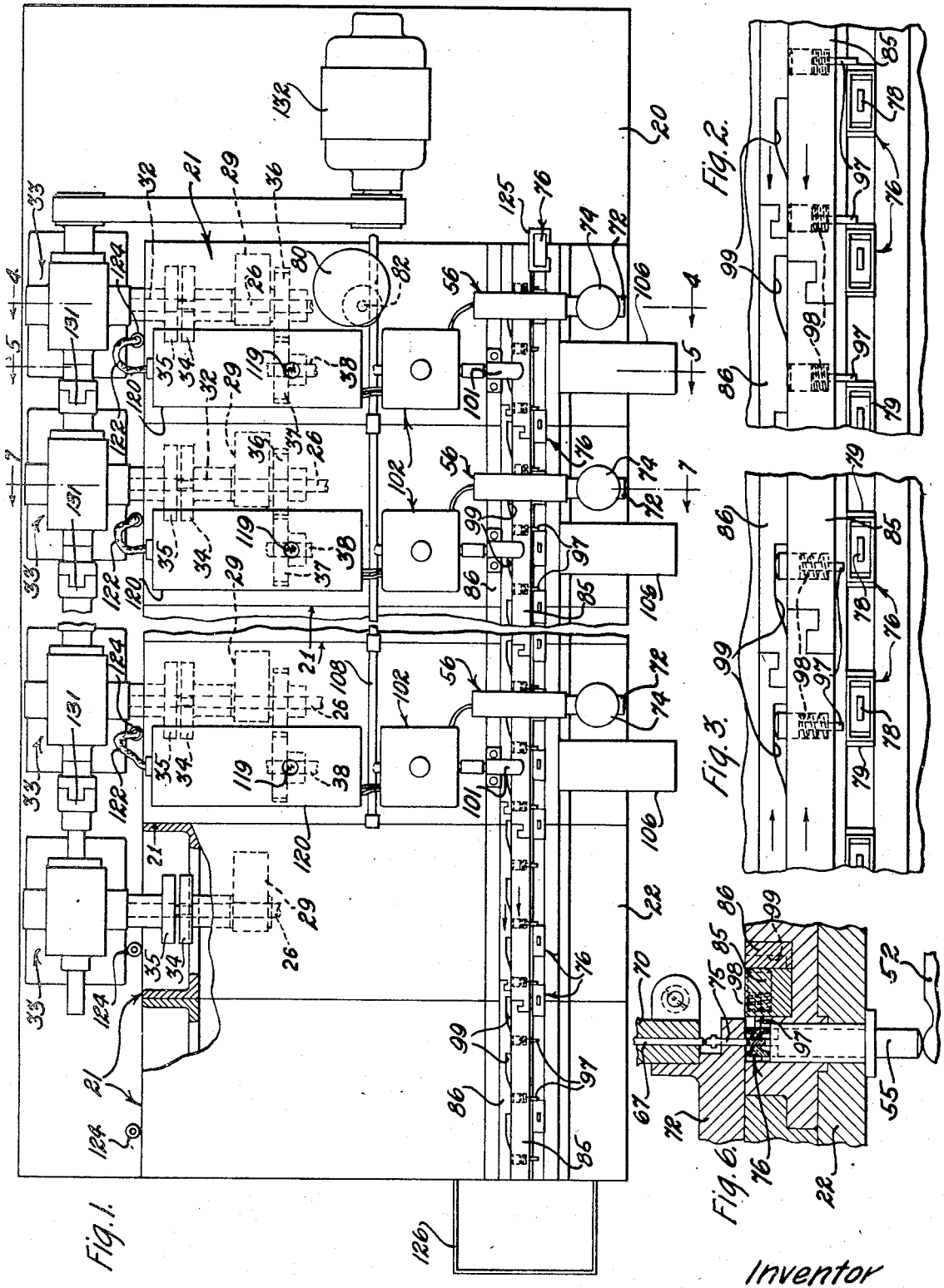
Inventor
Charles F. Dreyer
by Aug. 23, 1932.   C. F. DREYER   1,873,315
GAUGING APPARATUS
Filed Dec. 28, 1927   3 Sheets-Sheet 2

Inventor
Charles F. Dreyer
by *[signature]*, Atty.

Aug. 23, 1932.   C. F. DREYER   1,873,315
GAUGING APPARATUS
Filed Dec. 28, 1927   3 Sheets-Sheet 3
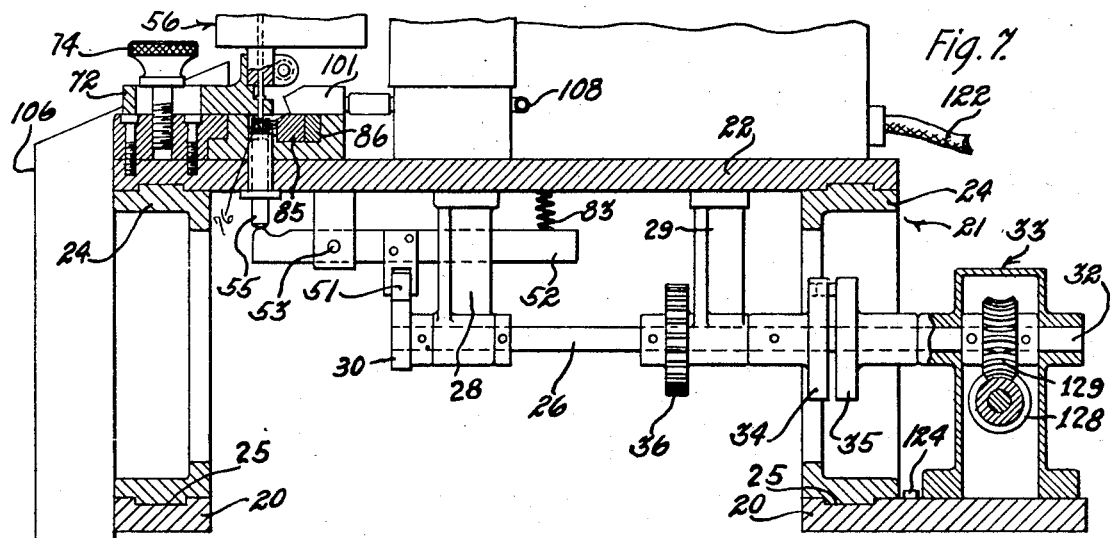
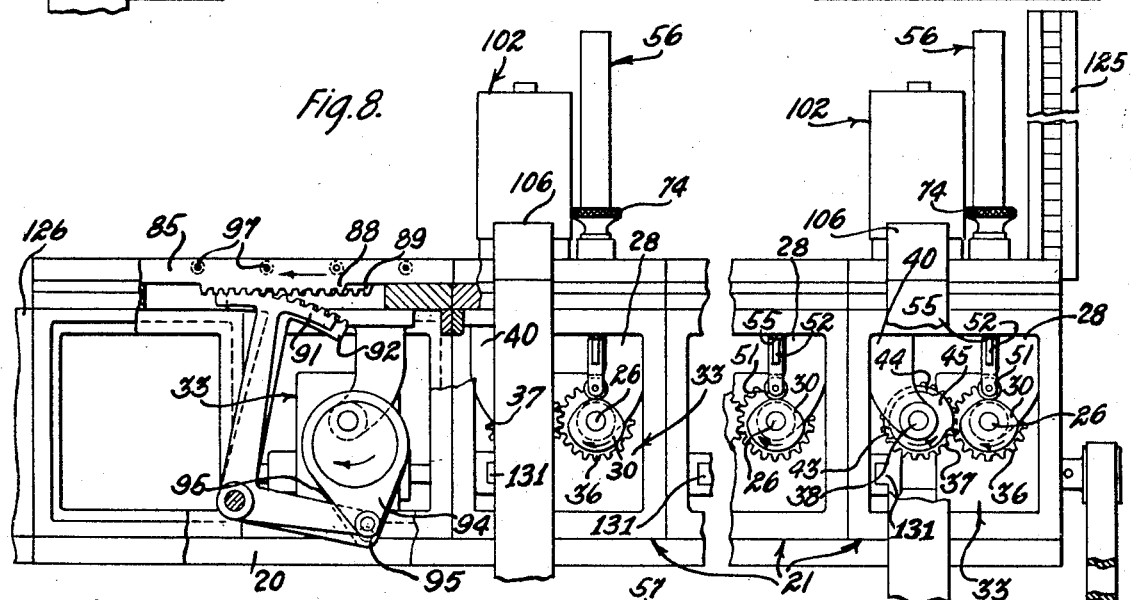
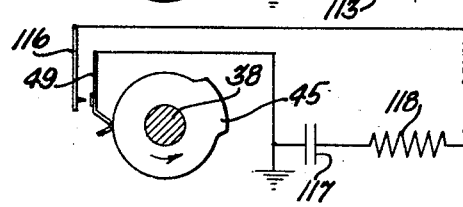
Inventor
Charles F. Dreyer
by N. H. Patterson Att'y Patented Aug. 23, 1932

1,873,315

UNITED STATES PATENT OFFICE

CHARLES FREDERICK DREYER, OF OAK PARK, ILLINOIS, ASSIGNOR TO WESTERN ELECTRIC COMPANY, INCORPORATED, OF NEW YORK, N. Y., A CORPORATION OF NEW YORK

GAUGING APPARATUS

Application filed December 28, 1927. Serial No. 243,007.

This invention relates to gauging apparatus, and more particularly to apparatus for successively subjecting an article to a plurality of gauging or testing operations.

It has been the practice in some instances in developing testing or gauging apparatus, to construct all of the cooperating elements of the machine in accordance with the particular type of gauging to be accomplished and not with the view of producing a machine of a universal nature which will readily lend itself to the making of varied types or forms of testing operations. In many instances gauging machines constructed with the primary view of meeting specific testing requirements incident to the use of the article to be gauged, are adapted only for making a specific, required test on the article, and in order to render the same machine adaptable for making other or different tests, the entire structure thereof must be rearranged. Similarly when it is desired to include an additional gauge or to change the order of the gauges in a machine designed to make a predetermined number of specific tests, considerable time and expense in rearranging or reconstructing the apparatus is necessarily experienced and in most instances it is more economical to build an entirely new machine.

The primary object of this invention is to provide a simple, durable and efficiently operable gauging apparatus, the constituent cooperating parts of which may be interchanged or rearranged to vary the character or order of the gauging operations with a minimum amount of effort and apparatus adjustment.

In accordance with the general features of the invention, one embodiment thereof includes a suitable machine frame and a plurality of gauge supporting units interchangeably and adjacently mounted upon the frame. Gauging means are interchangeably carried by each unit and a reciprocable conveyor mechanism is designed to intermittently associate articles to be gauged, such as protector blocks, commonly employed in telephone circuits, with the gauging means. Each gauging means is interchangeably connected with a source of electrical and mechanical power supply through the medium of mechanisms supported by each unit and gauging determinations are stored to control the submission of the article to ejection subsequent to the gauging operation in the event that the block does not meet with specific requirements. By having a plurality of interchangeably arranged gauging means, the invention provides a universal type of apparatus wherein the order or type of gauging may be readily changed without subjecting the cooperating elements of the apparatus to any structural alterations or rearrangements.

These and other objects will be more apparent from the following detailed description when considered in connection with the accompanying drawings, wherein Fig. 1 is a plan view of a universal type of gauging apparatus representing one embodiment of the invention;

Fig. 2 is an enlarged fragmentary plan view of a portion of the conveyor bars as viewed in Fig. 1;

Fig. 3 is a view similar to that disclosed in the Fig. 2, showing the relative positions of the conveyor bars during the return stroke thereof;

Fig. 6 is an enlarged fragmentary detailed view of a portion of the gauging means disclosed in Fig. 4, the protector block in Fig. 6 being shown in operative association with the gauging plunger;

Fig. 7 is a fragmentary vertical sectional view similar to Fig. 4 and is taken on the line 7—7 of Fig. 1;

Fig. 8 is a fragmentary front elevational view of the apparatus disclosed in Fig. 1, a portion of the left end thereof being broken away to more clearly disclose the mechanism for actuating the conveyor bars;

Fig. 9 diagrammatically discloses the electrical control circuits in association with the timing cams and gauging means, and Fig. 10 discloses an assembled protector block of the type capable of being gauged by the apparatus.

Figure 4:
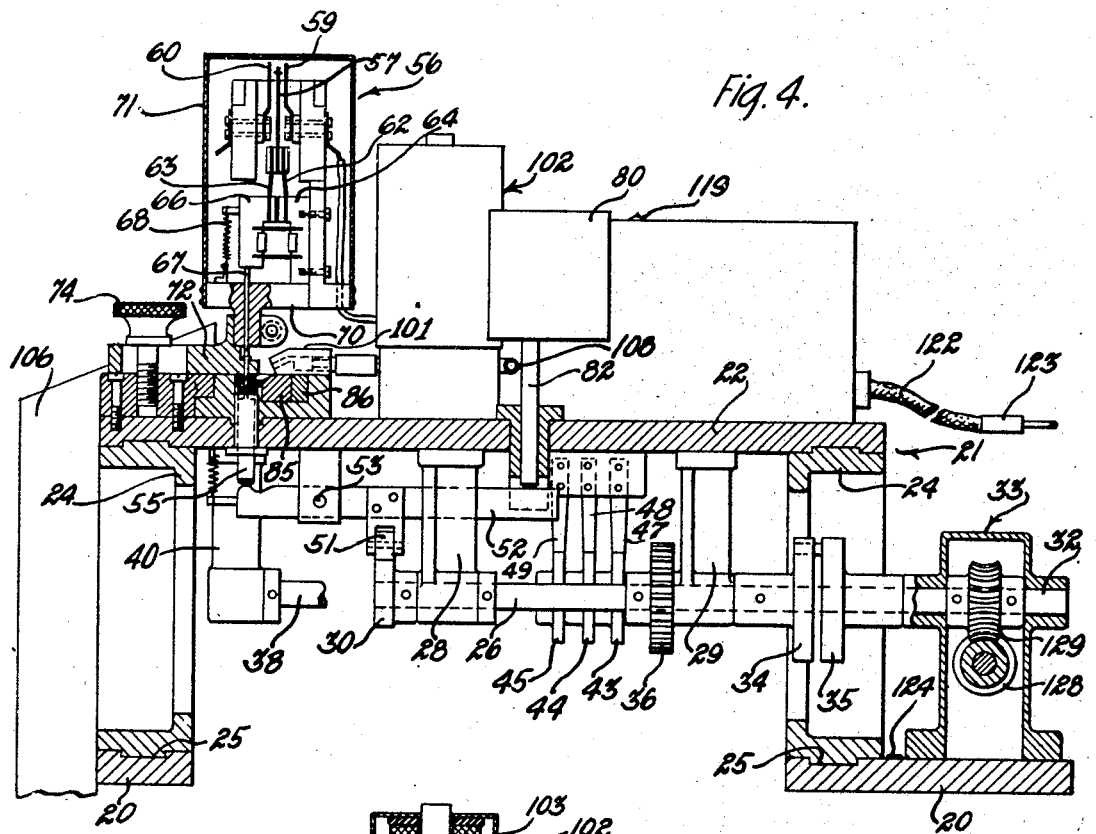
Fig. 4 is a transverse vertical sectional view taken on the line 4—4 of Fig. 1.
Figure 5:
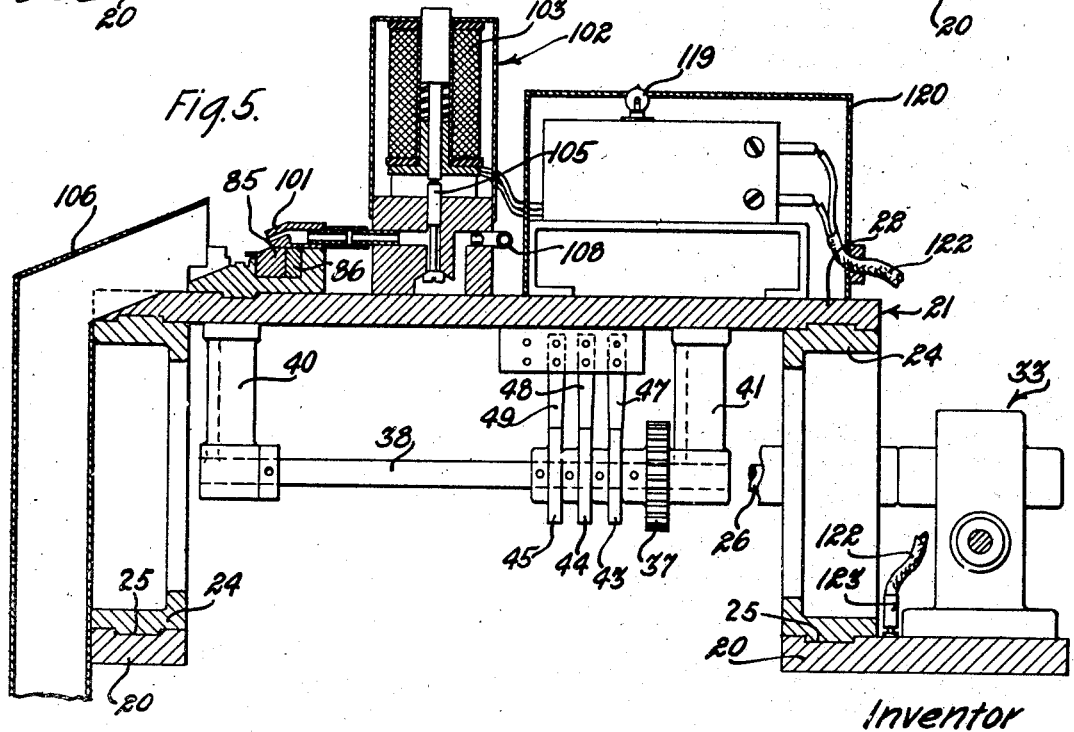
Fig. 5 is a similar transverse vertical sectional view taken on the line 5—5 of Fig. 1.

Referring now to the drawings wherein like numerals have been employed to designate similar parts throughout the various figures, it will be observed that a machine frame 20 interchangeably and detachably supports a plurality of units or sections indicated generally by the numeral 21. These sections or units 21 each comprises an upper mounting plate 22 supported at each end by upright frame members 24 which are maintained in a predetermined position upon the frame 20 by means of grooves 25 extending along the upper surface of the frame 20. It will be observed that certain of the cooperating elements carried by one of the units 21 are substantially the same as those carried by any of the other units. Thus each unit 21 supports a drive shaft 26 by means of depending brackets 28 and 29 (Fig. 4), the inner extremity of the shaft 26 being provided with a cam 30 and the opposite extremity thereof being connected to a drive shaft 32 of a driving mechanism 33 by means of a pair of clutch members 34 and 35. A gear 36 mounted upon each of the drive shafts 26 meshes with a companion gear 37 (Fig. 5) mounted upon a horizontal shaft 38 supported by depending brackets 40 and 41. This shaft 38 carries three adjacently positioned cams 43, 44 and 45 which engage with companion depending contact members 47, 48 and 49, respectively. The cam 30 on the drive shaft 26 (Fig. 4) cooperates with a roller follower 51 to control the movement of a lever 52 about a pivot 53. The lever 52 of each unit engages at its left end (Figs. 4 and 7) with a vertically slidable pin 55 which forms a cooperating element of gauging means denoted generally by the numeral 56.

The gauging means 56 may be of any convenient design which is best suited for the type of article to be gauged and for the purpose of illustrating one form of suitable gauging device, the gauging means 56 disclosed in the drawings is shown similar to the spring supported gauging device disclosed in the copending application of Lawrence Immanuel Dennison and Charles Frederick Dreyer, Serial No. 240,222, filed December 15, 1927. This gauging means 56 (Fig. 4) includes a movable switching member 57 positioned adjacent suitable contact springs 59 and 60 and supported by springs 62 and 63. The spring 62 is secured to a fixed block 64 while the spring 63 supports a movable gauge block 66, this gauge block 66 having an actuating pin 67 depending therefrom and a spring 68 associated therewith (Fig. 4) to properly bias the switching member 57. A base 70 of the gauging means 56 supports a casing or cover 71 and is detachably mounted by means of a depending portion thereof which is insertable within a suitable clamping means 72 which is adapted to be properly secured in position with respect to the article to be gauged by means of a thumb screw 74. The lower extremity of the actuating pin 67 engages the upper end of a gauge pin 75 (Fig. 6) and it will be readily understood that if a protector block 76 of the type disclosed in Fig. 10 is carried upwardly into association with the gauge pin 75, a carbon insert 78 thereof positioned within a porcelain block 79 will be carried into engagement with the pin 75 and if the movement experienced by this pin which is transmitted to the cooperating parts of the gauging means 56 is sufficient, the switching member 57 will be moved into engagement with the contact spring 59. The contacting of the member 57 with the spring 59 will affect certain electrical circuits later to be described.

All of the gauging mechanisms and parts cooperating therewith, thus far described, will be found to be substantially uniform or standard throughout the various units 21 but it is to be understood that the testing operation to which the protector block is subjected by the gauging elements of the unit 21 positioned at the extreme right (Fig. 1) differs from the testing operation to which the block is subjected by the gauging elements associated with the second unit 21 from the right (Fig. 1). The first unit 21 subjects the insert 78 within the porcelain block 79 to a weight test by means of a cylindrical weight 80 (Figs. 1 and 4) which is supported by a vertically positioned rod 82. This rod 82 rests upon the lever 52 and it will be clear that when the roller follower 51 is positioned adjacent the lower portion of the surface of the cam 30, the weight 80 will cause the pin 55 to be urged upwardly against the carbon insert 78. The carbon insert is cemented within its companion porcelain block 79 and as the upper surface of the block 79 engages the lower surface of the clamping member 72 (Figs. 4 and 6) the weight 80 will continue to exert its force upwardly against the insert. In the event that the insert is not dislodged as a result of the force supplied, the upward movement of the gauge pin 75 will not be sufficient to cause the switching member 57 to engage with the contact spring 59, but should the insert be dislodged or shifted with respect to the block 79, the movement of the pin 75 will be sufficient to cause the contacting of the member 57 and the spring 59. The weight test just described is to be distinguished from the test applied to the protector block when it is associated with the gauging mechanism of the unit disclosed in Fig. 7. In this instance the lever 52 is actuated by means of a spring 83 when the roller follower 51 is adjacent the lower surface portion of the cam 30 so as to effect the upward movement of the pin 55 as hereinbefore described. However, the operation of the gauge mechanism will, in this instance, be dependent upon the space between the plane of the upper surface of the porcelain block 79 and the upper surface of its companion insert 78 as distinguished from the operation of the gauge mechanism disclosed in Fig. 4 which is operable in response to the dislodgement or shifting of the insert within the block. If the above mentioned space or what is commonly called the air gap is below the required size, the insert will cause the upward movement of the pin 75 and the contacting of the members 57 and 59. The tests just described may be succeeded by numerous other tests and two types of tests have been described merely for the purpose of more clearly setting forth the universal nature or flexibility of gauging apparatus constructed in accordance with this invention. The protector blocks 76 are intermittently advanced from one unit to the next by means of reciprocable shifter bars 85 and 86 (Figs. 1 to 3 inclusive) comprised of a plurality of interconnected sections.

These conveyor bars 85 and 86, as stated above, comprise a plurality of individual sections which are similarly formed at each extremity to permit of a convenient interconnection between companion sections. A pair of these sections is companion to each of the units 21 and thus the number of sections employed in the apparatus will depend upon the number of units, or in other words, the number of testing operations to be performed. The lower surfaces of each of the conveyor bars 85 and 86 positioned near the left extremity of the machine (Figs. 1 and 8) are provided with rack teeth 88 and 89 which engage with gear segments 91 and 92, respectively (Fig. 8), through the action of eccentric mechanisms 94 and 95. The gear segments 91 and 92 which are carried by suitable bell cranks operate to cause the continuous reciprocation of the conveyor bars 85 and 86. Each of the sections of the conveyor bar 85 carries three conveyor pins 97 which are continuously urged inwardly by means of coil springs 98 (Figs. 2 and 3). Each of the sections of the conveyor bar 86 is formed with recesses 99 and it is to be understood that when these recesses 99 occupy a position adjacent the pins 97, said pins will be free to be moved into the bar 85 through the action of the coil spring 98. Referring to Fig. 2 it will be observed that the two bars 85 and 86 are shown at the beginning of their advancing movement to the left with the conveyor pin projecting outwardly from the bar 85 and engaging a protector block 76. The conveyor bar 85 will reach the limit of its stroke or movement to the left prior to the completion of a similar movement by the bar 86, the movement of which lags slightly behind the movement of the bar 85. Hence as the bar 85 reaches the limit of its advancing stroke, the bar 86 will continue to advance sufficiently to bring the recesses 99 into association with the pin 97 and the springs 98 will cause the immediate retraction of the pin. Thus as the two bars move to the right, as shown in Fig. 3, the outer ends of the pins 97 will clear the side of the protector block just advanced, and as the bar 85 reaches the limit of its stroke to the right the bar 86 will continue to move to the right sufficiently to cause the pin 97 to be urged downwardly. Upon the advancing stroke, the pins 97 will again cause the advancement of another block in the manner just described. Thus, the positive intermittent advancement of the protector blocks from one unit to the next is very conveniently effected, and as each block is advanced from beneath the gauging means 56, it is moved into association with a nozzle 101 of an ejecting mechanism denoted generally by the numeral 102.

This ejecting mechanism 102 is similar for all of the units 21 and includes a solenoid 103 which is operatively connected with a valve stem 105 (Fig. 5) of a suitable air valve. In the event that the solenoid 103 is energized, the valve stem 105 will be moved downwardly to permit the passage of air through the nozzle 101 and thereby effect the ejection of an imperfect protector block into a suitable chute 106. The compressed air supplied to the nozzle 101 is introduced by means of pipe sections 108 carried by each of the units 21 which are connected with a common source of compressed air supply (not shown). In order to more clearly understand the control of the operation of the solenoid 103 and the consequent ejection of a protector block, attention is directed to the electrical circuits disclosed in Fig. 9.

For purposes of illustration, consider a protector block as having been carried into association with the gauge pin 75, as clearly disclosed in Fig. 6. As the pin 55 carries a protector block into association with the gauge pin 75, the cam 43 will assume the position disclosed in Fig. 9 and will carry the member 47 into engagement with a companion contact member 109. In the event that the pin 75 is moved sufficiently to cause the engagement of the switching member 57 of the gauging means 56 with the spring 59, a circuit will be closed which may be traced from ground through the switch member 57, the contact spring 59, the contact members 109 and 47, a relay 110, a fuse 112 to a battery 113 or other suitable source of current supply. At the same instant the cam 44 causes the engagement of the member 48 with a companion contact member 115 and the energizing of the relay 110 closes a locking circuit which may be traced from ground through the contact members 48 and 115, through the relay 110, the fuse 112, and then to the battery 113. Thus it will be observed that the cam 44 serves to maintain the relay 110 energized after the first described circuit has been broken. Upon continued rotation of the shaft 38 which carries the above mentioned cams, the cam 45 causes the contact member 49 to be carried into contact with a companion member 116, and this will serve to close the circuit which may be traced from ground through the battery 113, a contact of the relay 110, the solenoid 103, the contact members 116 and 49, to ground. During the interval of time which is required for the shaft 38 to rotate so as to move the cams from their initial position as disclosed in Fig. 9 to the position in which the raised portion of the surface of the cam 45 is carried into operative association with the contact member 49 as described, the gauged protector block will have been advanced from beneath the gauging means 56 to a position immediately adjacent the tip of the ejecting nozzle 101. Thus the closing of the circuit which is occasioned upon the engagement of the raised surface of the cam 45 with the contact member 49, causes the energizing of the solenoid 103 and consequently the opening of the air valve sufficiently to effect the positive ejectment of the gauged protector block into the chute 106. Obviously, if the block is not defective, the switching member 57 of the gauging means will not be carried into contact with the spring 59 and hence the closing of the circuits as just described will not take place and the block will be advanced to the next gauging station. To prevent the arcing of various contact points in the circuit (Fig. 9) a suitable condenser 117 and resistance 118 are provided and these elements of the circuit together with the relay 110 and a signalling lamp 119 for indicating the condition of the circuits to an operator, are conveniently housed within a casing 120, as clearly disclosed in Fig. 5. Suitable conductors 122 (Figs. 1 and 4) are provided having a conventional connecting plug 123 at the extremity thereof which may be inserted within companion jacks or sockets 124 to interchangeably connect the elements of the described circuits with a convenient and common source of electrical supply such as the battery 113 in Fig. 9.

From the foregoing description it will be understood that protector blocks to be gauged may be inserted within a magazine 125 (Figs. 1 and 8) and the lowermost block within the magazine will be advanced by the action of the conveyor pins 97, each block being intermittently advanced beneath each gauging means 56, and if the block is not ejected into one of the chutes 106 it will finally be delivered to a suitable receiving means 126 (Fig. 1). Rotation is imparted to the shaft 26 of each unit 21 by the driving mechanisms 33 which comprise a worm 128 and a worm wheel 129. Each of these driving mechanisms 33 is detachably mounted upon the frame 20 and they are interconnected by means of suitable couplings 131, rotation being imparted to the worms 128 by a motor 132. It will be clear that this invention provides a gauging apparatus comprised of a plurality of interchangeable units having uniform or standard cooperating parts, and by reason of this interchangeable arrangement, additional units may be added or removed or interchanged with very little effort and with no structural rearrangement. Thus, the apparatus may be employed to make any number of varied types of testing operations and the order in which the testing operations are practiced may very easily be changed.

Although the invention has been described in connection with gauging apparatus particularly adaptable for use in connection with the testing of protector blocks, it will be apparent that the described apparatus lends itself for use in connecton with a wide variety of testing operations and therefore the invention should be limited only by the scope of the appended claims.

What is claimed is:

1. In gauging apparatus, gauging means, a source of power supply, interchangeable means for connecting the gauging means with the source of power supply, and means for intermittently advancing work to the gauging means comprising a plurality of interconnected sections, each section being companion to one of the interchangeable connecting means.

2. In gauging apparatus, a plurality of gauges for making a series of different tests, a source of power supply, interchangeable means for supporting the gauges, means carried by each supporting means for interchangeably connecting the gauges with the source of power supply, work conveying means comprising a plurality of interconnected and interchangeable sections associated with the supporting means, and means for reciprocating the work conveying means.

3. In gauging apparatus, a frame, a plurality of interchangeable support units adjustably mounted upon the frame, a gauge carried by each unit, a common source of power supply, means carried by each unit for interchangeably connecting the gauges with the common source of power supply, reciprocable means for intermittently conveying work to the gauges including a plurality of interconnected and interchangeable sections, and means connected with the common source of power supply for operating the conveying means.

4. In a gauging apparatus, gauging means, a source of power supply, interchangeable means for connecting the gauging means with the source of power supply, means for intermittently advancing work to the gauging means comprising a plurality of interconnected sections, each section being companion to one of the interchangeable connecting means, and a plurality of work engaging members disposed in operative relation with the sections.

5. In a gauging apparatus, gauging means, a source of power supply, interchangeable means for connecting the gauging means with the source of power supply, means for intermittently advancing work to the gauging means comprising a plurality of interconnected sections, each section being companion to one of the interchangeable connecting means, a plurality of work engaging members disposed in operative relation with the sections, and means for actuating the sections for moving the work engaging members into and out of movable relation with the work.

6. In a gauging apparatus, gauging means, a source of power supply, interchangeable means for connecting the gauging means with the source of power supply, means for intermittently advancing work to the gauging means comprising a plurality of interconnected sections, each section being companion to one of the interchangeable connecting means, a plurality of work engaging members disposed in operative relation with the sections, means for actuating the sections for moving the work engaging members into and out of movable relation with the work and for moving the work.

In witness whereof, I hereunto subscribe my name this 17th day of December A. D., 1927.

CHARLES FREDERICK DREYER.